United States Patent
Chen et al.

(10) Patent No.: US 7,397,753 B2
(45) Date of Patent: Jul. 8, 2008

(54) SYSTEM AND METHOD FOR MEASURING SIGNAL DEVIATION USED IN AN OPTICAL RECORDING/REPRODUCING APPARATUS

(75) Inventors: Jeng-Jiun Chen, Hsinchu (TW); Bor-Ruey Chen, Hsinchu (TW); Chao-Jen Chen, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 597 days.

(21) Appl. No.: 11/140,062

(22) Filed: May 31, 2005

(65) Prior Publication Data
US 2005/0265147 A1 Dec. 1, 2005

(30) Foreign Application Priority Data
Jun. 1, 2004 (TW) .................................. 93115710

(51) Int. Cl.
*G11B 7/00* (2006.01)
(52) U.S. Cl. ............................ 369/124.01; 369/124.14; 369/44.34
(58) Field of Classification Search .............. 369/44.41, 369/44.42, 47.13, 124.01, 112.12, 112.13, 369/44.34, 124.12, 124.13, 124.14
See application file for complete search history.

(56) References Cited

U.S. PATENT DOCUMENTS 6,594,210 B2 * 7/2003 Kumagai ................. 369/47.17
7,197,004 B2 * 3/2007 Horiyama .............. 369/112.03

* cited by examiner

*Primary Examiner*—Nabil Z Hindi
(74) *Attorney, Agent, or Firm*—Ming Chow; Sinorica, LLC

(57) ABSTRACT

A method and system for measuring the signal deviation are applied to an optical recording/reproducing apparatus. The optical recording/reproducing apparatus comprises an optical pickup head for receiving Differential Push Pull (DPP) signals reflected from an optical recording medium to trace the tracks on the surface of the optical recording medium. The DPP signal comprises a Main beam Push Pull (MPP) signal and a Sub-beam Push Pull (SPP) signal. The method firstly receives the MPP signal and the SPP signal to generate an MPP waveform and an SPP waveform separately. Then, the MPP waveform and the SPP waveform are combined to generate an amplitude waveform function. Finally, according to the amplitude waveform function, a phase difference between the MPP signal and the SPP signal is estimated. An adjusting direction can be further determined according to a relative position between the SPP waveform and the MPP waveform.

11 Claims, 4 Drawing Sheets

SYSTEM AND METHOD FOR MEASURING SIGNAL DEVIATION USED IN AN OPTICAL RECORDING/REPRODUCING APPARATUS

BACKGROUND OF THE INVENTION

1. Field of the Invention

The present invention relates to an optical recording/reproducing apparatus, and especially to a signal deviation measuring system and method applied to an optical recording/reproducing apparatus.

2. Prior Art

Refer to FIG. 1, which is a diagram showing a conventional optical pickup head in a state of reading data. The optical recording/reproducing apparatus 4 uses the pickup head 2 to read the data. The pickup head includes a lens set 8 and a light source 6 for emitting a light beam 16. The light beam 16 goes through the lens set 8 and then focuses on a surface of an optical recording medium 10 such as a compact disk. As shown, the light beam 16 reflects back from the optical recording medium 10 and then projects onto a photodetector 12 located in the pickup head 2. The photodetector 12 identifies the projected light beam 16 and transforms it into relevant electric signals that realize the data recorded by the surface of the optical recording medium 10.

Refer to FIG. 2, which is a diagram showing a main beam 16a and a sub-light beam 16b of the light beam 16 of FIG. 1. In the optical recording technique, data is stamped on the surface of the optical recording medium 10 as a spiral track 14. In order to read the accurate position in the spiral track 14, the pickup head 2 can correct the beam position by analyzing a tracking error signal while in tracking the spiral track 14.

In a high-capacity optical recording/reproducing apparatus, such as a DVD+R/RW or a DVD-R/RW, a differential push pull (DPP) method is used to calculate a tracking error signal. As stated above that the light beam 16 emitted from the light source 6 includes the main beam 16a and the sub-beam 16b, after the light beam 16 is reflected from the optical recording medium 10, the main beam 16a and the sub-beam 16b would represent as a main beam push pull (MPP) and a sub-beam push pull (SPP). The MPP signal and the SPP signal are combined as the differential push pull (DPP), and the pickup head 2 uses the DPP signal to track the spiral track 14 and correct the beam position.

The electric signal mentioned above can be transported to the IC board of the optical recording/reproducing apparatus 4. Generally speaking, the MPP signal and the SPP signal can be acquired from the IC board of the optical recording/reproducing apparatus 4 by using a data acquisition card (DAQ card). The MPP signal and the SPP signal being acquired can be realized as a sine wave (maybe represented by $\sin(\omega t)$). However, the optical recording/reproducing apparatus 4 always has some built-in errors, for example the manufacturing tolerances of the pickup head 2 or optical errors generated from inaccurate mounting of the lens set 8. All these errors would cause the light beam center and its moving direction to shift away along a radial direction of the optical recording medium 10. Thus, the built-in errors would weaken the DPP signal to an unrecognizable degree. Definitely, wrong realization upon the data would be inevitable.

SUMMARY OF THE INVENTION

An object of the present invention is to provide a signal deviation measuring system applied to an optical recording/reproducing apparatus, and a method for applying to the same. The present invention can realize the relative position and the phase difference between the MPP signal and the SPP signal, and, according to the relative position and the phase difference can have the aforesaid problem described previously resolved.

In order to achieve the above-mentioned object, the present invention provides a signal deviation measuring system applied to an optical recording/reproducing apparatus, and z method for applying to the same. The optical recording/reproducing apparatus comprises an optical pickup head for receiving Differential Push Pull (DPP) signals reflected from an optical recording medium so as to help trace the tracks on the surface of the optical recording medium.

The DPP signal comprises a Main beam Push Pull (MPP) signal and a Sub-beam Push Pull (SPP) signal. The MPP signal and the SPP signal can be transformed into the respective electronic signal for further being transported into an IC board in the optical recording/reproducing apparatus.

The system comprises a signal line, a data acquisition card, an estimating module, a waveform comparing module, and a correction signal generating module.

The data acquisition card is used to receive both the MPP signal and the SPP signal via the signal line. According to the MPP signal and the SPP signal, the data acquisition card can firstly generate the MPP waveform and the SPP waveform, respectively. Then, the data acquisition card can also combine the MPP waveform and the SPP waveform so as to generate an amplitude waveform function.

The estimating module is used for estimating the phase difference between the MPP signal and the SPP signal according to the amplitude waveform function.

The waveform comparing module is used for selecting a MPP waveform from a predetermined position and determining the slope of the MPP waveform. Then, the waveform comparing module compares the SPP waveform and the MPP waveform so as to generate a relative position between the SPP waveform and the MPP waveform.

The correction signal generating module is used for determining an adjusting direction of the mechanism according to the relative position, and thereby the following devices can use the adjusting direction and the phase difference to correct the deviation.

Therefore, the system and method provided by the present invention can have the phase difference estimated by the estimating module and the relative position generated by the waveform comparing module. Then, the mechanism of the optical recording medium can be adjusted to correct the deviation of the light beam position based on the phase difference and relative position.

BRIEF DESCRIPTION OF THE DRAWINGS

Other objects, advantages, and novel features of the present invention will become more apparent from the following detailed description when taken in conjunction with the accompanying drawings, in which.

DETAILED DESCRIPTION OF THE PRESENT INVENTION

Figure 1:
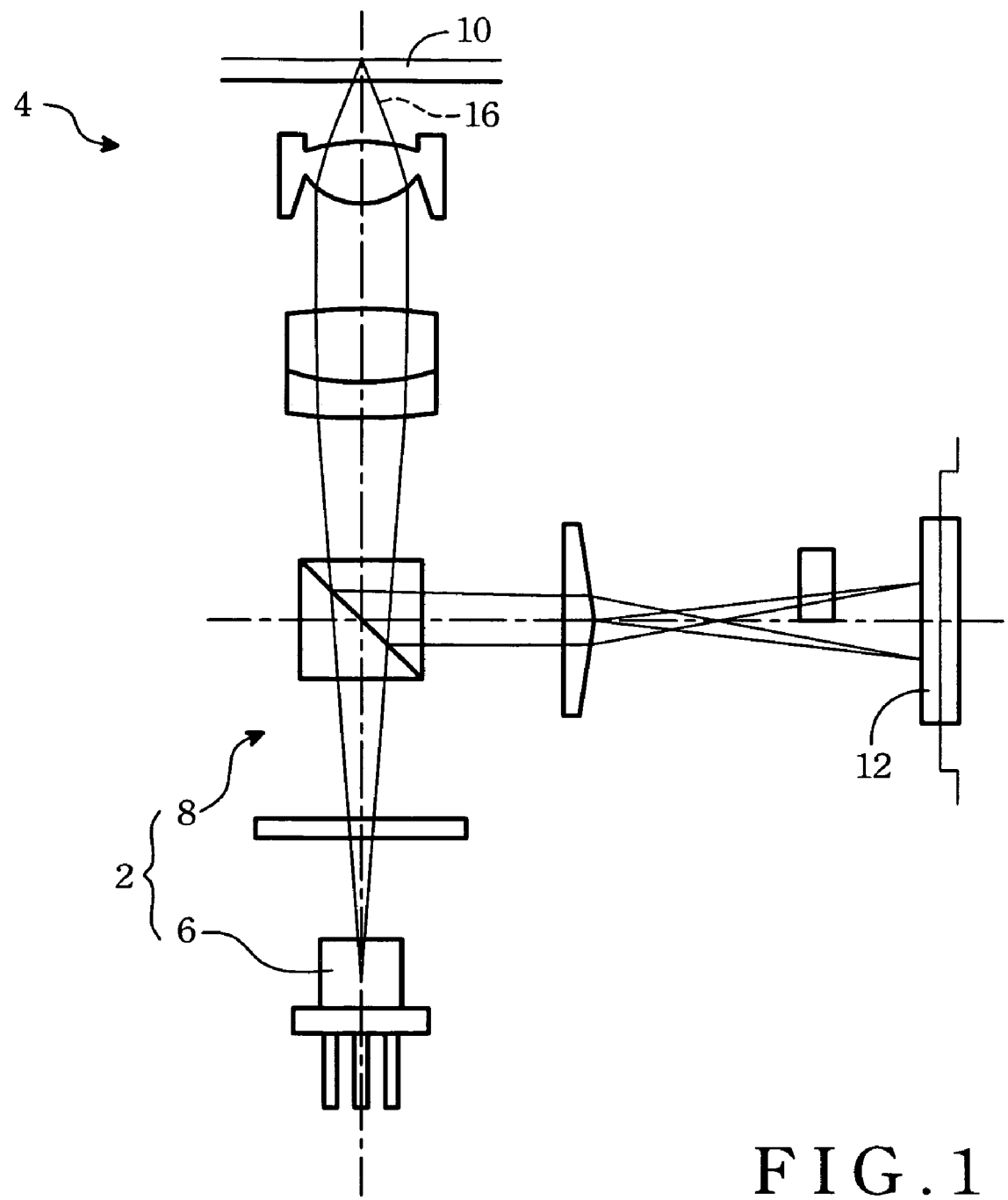
FIG. 1 is a diagram of a conventional optical pickup head in reading data.
Figure 2:
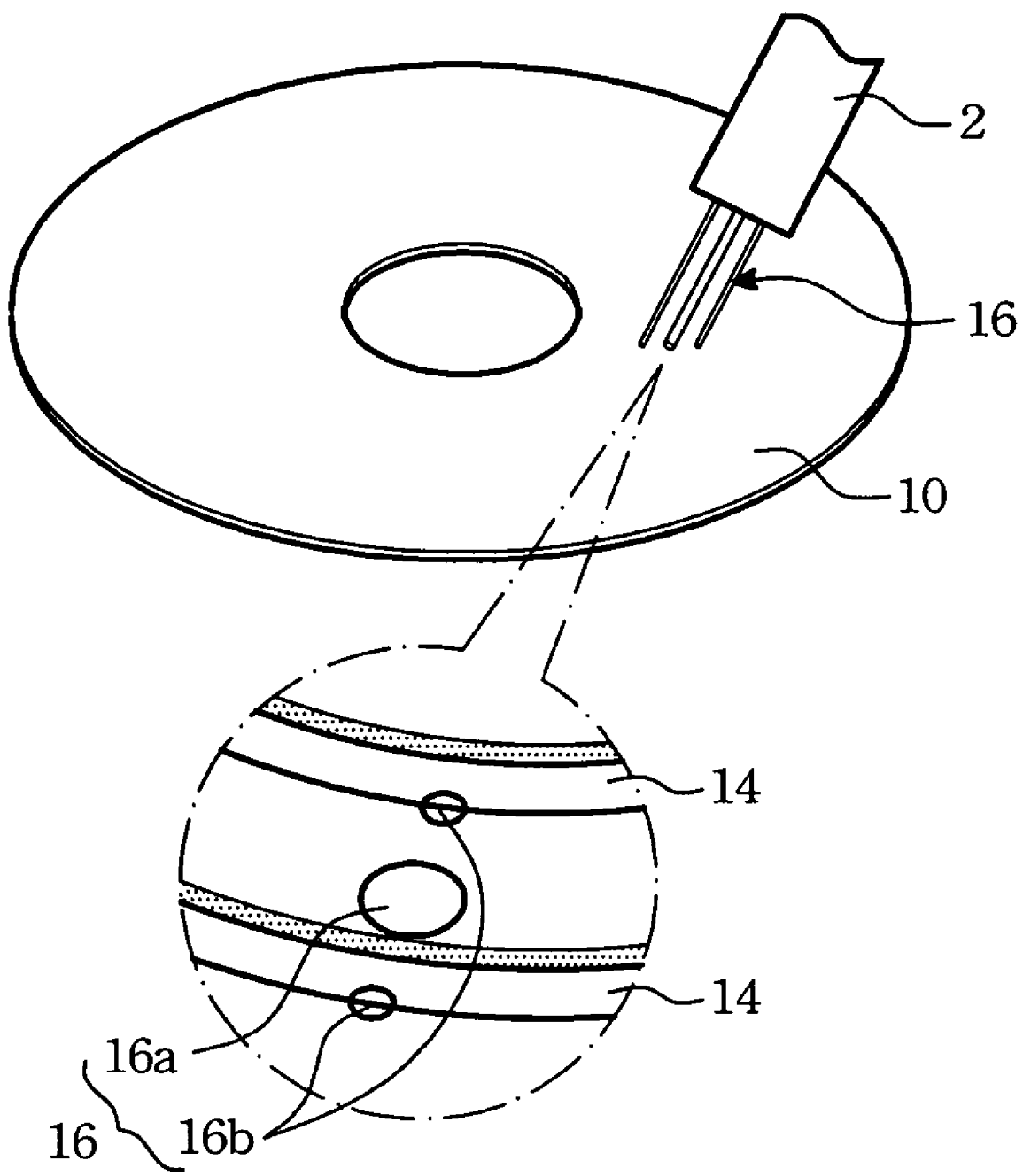
FIG. 2 is a diagram showing the main beam and a sub-beam of the light beam of FIG. 1.
Figure 3:
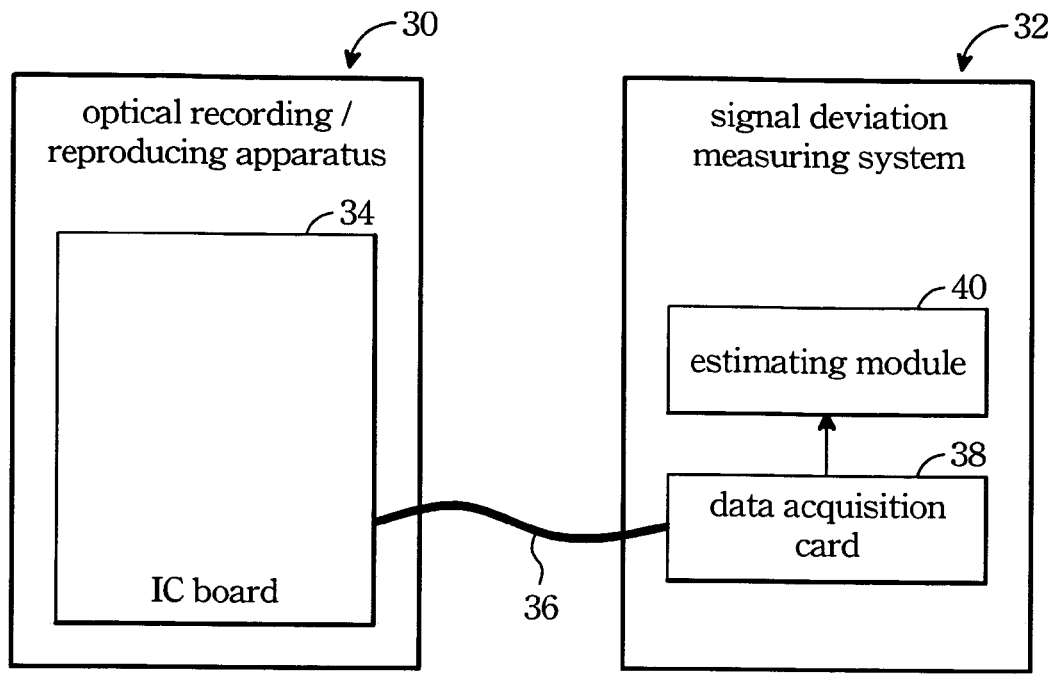
FIG. 3 is a diagram of a preferred signal deviation measuring system for measuring the phase difference according to the present invention.

Refer to FIG. 3, which is a diagram of a preferred signal deviation measuring system 32 for measuring the phase difference according to the present invention. The present invention provides a signal deviation measuring system 32 applied to an optical recording/reproducing apparatus 30. The optical recording/reproducing apparatus 30 comprises an optical pickup head (as shown in FIG. 1) for receiving Differential Push Pull (DPP) signal reflected from an optical recording medium for tracing the tracks on the surface of the optical recording medium. The DPP signal comprises a Main beam Push Pull (MPP) signal and a Sub-beam Push Pull (SPP) signal. The DPP signal is a tracking error signal when the system applied to a DVD+R/RW or a DVD-R/RW.

When the MPP signal and the SPP signal are transformed into the electronic signal, they are then transported into an IC board 34 in the optical recording/reproducing apparatus 30. The system 32 comprises a signal line 36, a data acquisition card 38, and an estimating module 40.

The signal line 36 for transporting the electric signal connects the IC board 34 and the data acquisition card 38. The data acquisition card 38 (DAQ card) is used for receiving the MPP signal and the SPP signal via the signal line 36. According to the MPP signal and the SPP signal, the data acquisition card 38 can generate the MPP waveform and the SPP waveform, respectively.

The MPP waveform and SPP waveform are defined as sine waves ($\sin(\omega t)$). In the case that a phase difference $\Phi$ exists between the MPP signal and the SPP signal due to possible mechanism errors, it can be much easy to define the MPP signal as a $\sin(\omega t)$ and the SPP signal as a $\sin(\omega t + \Phi)$.

Then, the data acquisition card 38 combines the MPP waveform and the SPP waveform to generate an amplitude waveform function A(t). The amplitude waveform function A(t) can be used to define its amplitude as Amplitude(A(t)).

Because the amplitude waveform function A(t) is the sum of the MPP waveform, $\sin(\omega t)$, and the SPP waveform, $\sin(\omega t + \Phi)$, following equations for A(t) and $\Phi$ can be defined.

$$A(t) = \sin(\omega t) + \sin(\omega t + \Phi) = 2\cos(\Phi/2) \times \sin(\omega t + \Phi/2);\text{ and}$$

$$\Phi = 2 \times \cos^{-1}(\text{Amplitude}(A(t))/2)$$

According to Amplitude(A(t)) which can be acquired by the data acquisition card 38, the estimating module 40 can estimate the phase difference $\Phi$ by the above equation. In the present invention, the phase difference $\Phi$ can be used as a basis to correct the mechanism errors.

Figure 4:
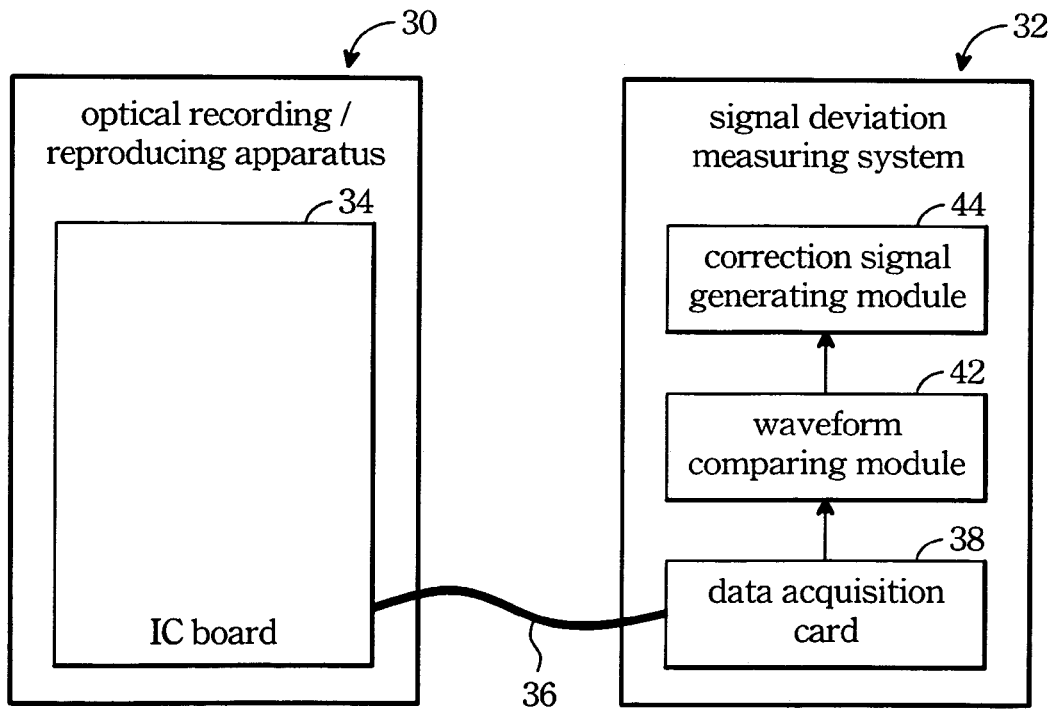
FIG. 4 is a diagram of another signal deviation measuring system for measuring the adjusting direction according to the present invention.

For the phase difference $\Phi$ is caused by the mechanism errors, so an adjusting direction upon the mechanism to correct the mechanism errors is needed. Refer to FIG. 4, which is a diagram of a preferred signal deviation measuring system 32 for measuring the adjusting direction according to the present invention. Compared to the embodiment shown in FIG. 3, the signal deviation measuring system 32 of FIG. 4 further includes a waveform comparing module 42 and a correction signal generating module 44 for measuring the adjusting direction of the mechanism, but waiving the estimating module 40 of FIG. 3.

With the help of the data acquisition card 38, the waveform comparing module 42 can be used for selecting a particular MPP waveform from a predetermined position and confirming whether the slope of the MPP waveform is negative or positive. Then, the waveform comparing module compares the SPP waveform and the MPP waveform so as to generate a relative position between the SPP waveform and the MPP waveform.

The correction signal generating module 44 is used for determining a correction signal of an adjusting direction of the mechanism according to the relative position, and thereafter the following devices can use the adjusting direction and the phase difference to correct the deviation. Finally, the system can correct the light beam deviation based on the adjusting direction and the phase difference.

For example, in the case that the slope of the MPP waveform is positive and the SPP waveform is upper than the MPP waveform, then the system 32 can correct the mechanism of the optical recording/reproducing apparatus 30 in a first direction. The first direction is defined by the relationship between the mechanism and the light beam, but varies from one optical recording/reproducing apparatus to another. In another example, in the case that the slope of the MPP waveform is positive but the SPP waveform is lower than the MPP waveform, then the system 32 can adjust the mechanism of the optical recording/reproducing apparatus 30 in a second direction which is opposite to the first direction. For the same reason, in the case that the slope of the MPP waveform is negative and the SPP waveform is upper than the MPP waveform, the system 32 can adjust the mechanism of the optical recording/reproducing apparatus 30 in the second direction. Also, in the case that the slope of the MPP waveform is negative but the SPP waveform is lower than the MPP waveform, the system 32 can then adjust the mechanism of the optical recording/reproducing apparatus 30 in the first direction.

The estimating module 40, the waveform comparing module 42, and the correction signal generating module 44 can be assembled inside or outside the optical recording/reproducing apparatus 30, but the data acquisition card 38 is usually an external device to the apparatus 30. For this reason, while in application, the estimating module 40, the waveform comparing module 42, the correction signal generating module 44, and the data acquisition card 38 are all assembled together as a unique device to connect externally to the optical recording/reproducing apparatus 30. Upon such an arrangement, the unique device can monitor every optical recording/reproducing apparatus in the production line.

Moreover, the estimating module 40, the waveform comparing module 42, and the correction signal generating module 44, and other devices of the system 32 can be compiled into application programs in C language or Assembly Language. After compiled, the application programs can be stored in a ROM or a flash memory. The system 32 can order the CPU to calculate and process the application programs to further execute the above functions. Those devices can also be compiled by the Verilog or the VHDL language, and then saved in the complex programmable logic device (CPLD) or the FPGA to further operate the related functions.

Figure 5:
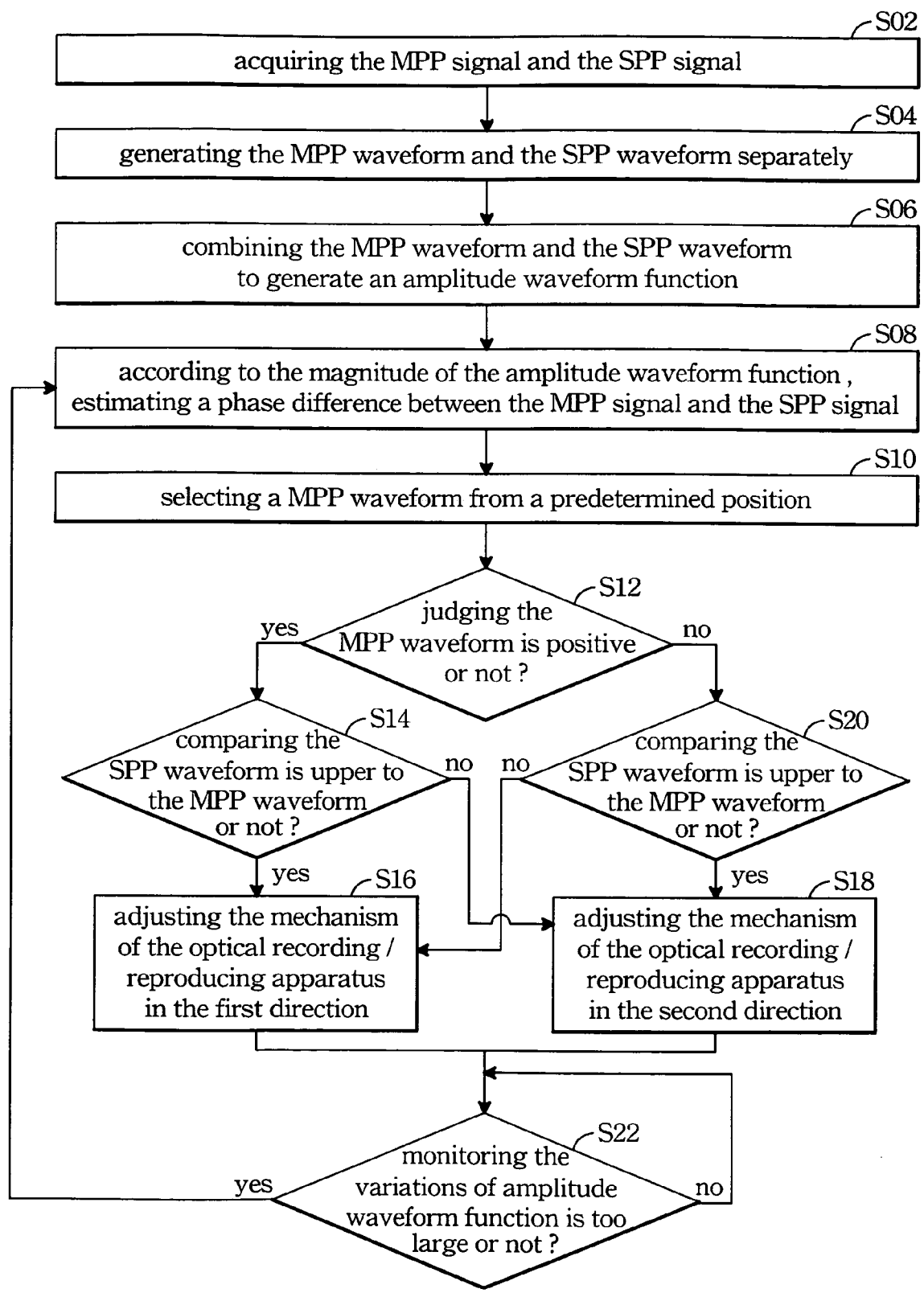
FIG. 5 is a flow chart of a preferred signal deviation measuring method according to the present invention.

Refer to FIG. 5, which is a flow chart of a preferred signal deviation measuring method according to the present invention. The signal deviation measuring method of the present invention comprises the following steps:

Step S02: Use the data acquisition card 38 to receive the MPP signal and the SPP signal.

Step S04: The data acquisition card 38 utilizes the MPP signal and the SPP signal to generate the MPP waveform and the SPP waveform separately.

Step S06: The data acquisition card 38 combines the MPP waveform and the SPP waveform to generate an amplitude waveform function A(t).

Step S08: According to the amplitude waveform function A(t) and the magnitude of the amplitude waveform function Amplitude(A(t)), use the equation, $\Phi=2\times\cos^{-1}$ (Amplitude (A(t))/2), to estimate a phase difference between the MPP signal and the SPP signal.

Step S10: Select a MPP waveform from a predetermined position.

Step S12: Judge whether the MPP waveform is positive or not.

If positive in step S12, proceed step S14 to determine if the SPP waveform is upper to the MPP waveform or not. If positive in step S14, then proceed step S16 to adjust the mechanism of the optical recording/reproducing apparatus in the first direction. The first direction is defined by the allocation of the mechanism and the light beam, and varies from one optical recording/reproducing apparatus to another. If negative in step S14, proceed step S18 to adjust the mechanism of the optical recording/reproducing apparatus in the second direction which is opposite to the first direction.

If negative in step S12, proceed step S20 to determine if the SPP waveform is upper to the MPP waveform or not. If positive in step S20, proceed step S18 to adjusting the mechanism of the optical recording/reproducing apparatus in the second direction. If negative in step S14, proceed step S16 to adjust the mechanism of the optical recording/reproducing apparatus in the first direction.

Step S22: Monitor the variations of amplitude waveform function A(t) of every optical recording/reproducing apparatus in the production line. When the detected variation is too large (by compared to a basic value), then re-proceed step S08 to keep generating the phase difference and the adjusting direction for adjusting the deviation in the production line.

Thus, the system and method provided by the present invention can get the phase difference estimated by the estimating module 32 and the relative position generated by the waveform comparing module 40. The present invention adjusts the mechanism of the optical recording medium to correct the deviation of the light beam position based on the phase difference and relative position. Furthermore, the signal deviation measuring system 32 of the present invention can be externally connected to the optical recording/reproducing apparatus, and thus it is convenient for monitoring every optical recording/reproducing apparatus in the production line.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for measuring a signal deviation, applied to an optical recording/reproducing apparatus, the optical recording/reproducing apparatus comprising an optical pickup head for receiving a Differential Push Pull (DPP) signal reflected from an optical recording medium to trace tracks on a surface of the optical recording medium, the DPP signal comprising a Main beam Push Pull (MPP) signal and a Sub-beam Push Pull (SPP) signal, the method comprising the following steps:

receiving the MPP signal and the SPP signal;

according to the MPP signal and the SPP signal, generating a MPP waveform and a SPP waveform, respectively, by a data acquisition card;

combining the MPP waveform and the SPP waveform to generate an amplitude waveform function A(t); and according to the amplitude waveform function, estimating a phase difference between the MPP signal and the SPP signal.

2. The method of claim 1, wherein the phase difference is caused by mechanism errors of the optical recording/reproducing apparatus, the method further comprising the following steps:

selecting the MPP waveform from a predetermined position;

confirming a slope of the MPP waveform; comparing the SPP waveform and the MPP waveform; and according to a relative position between the SPP waveform and the MPP waveform, determining an adjusting direction of the mechanism.

3. The method of claim 1, wherein the data acquisition card is used to combining the MPP waveform and the SPP waveform to generate the amplitude waveform function.

4. The method of claim 1, wherein the DPP signal is a tracking error signal being applied to a DVD device.

5. The method of claim 4, wherein the DVD device is selected one from a group consisting of a DVD+R/RW and a DVD−R/RW.

6. The method of claim 1, wherein the MPP waveform and SPP waveform are defined as sine waves, the method estimating the phase difference D between the MPP signal and the SPP signal by an equation $\Phi=2\times\cos^{-1}$ (Amplitude(A(t))/2), wherein the Amplitude(A(t)) is a magnitude of the amplitude waveform function A(t).

7. A system for measuring a signal deviation, applied to an optical recording/reproducing apparatus, the optical recording/reproducing apparatus comprising an optical pickup head for receiving a Differential Push Pull (DPP) signal reflected from an optical recording medium to trace tracks on a surface of the optical recording medium, the DPP signal comprising a Main beam Push Pull (MPP) signal and a Sub-beam Push Pull (SPP) signal, the MPP signal and the SPP signal being transformed into an electronic signal to further be transported into an IC board in the optical recording/reproducing apparatus, the system comprising:

a signal line;

a data acquisition card for receiving the MPP signal and the SPP signal via the signal line, generating an MPP waveform and an SPP waveform respectively according to the MPP signal and the SPP signal, and further combining the MPP waveform and the SPP waveform to generate an amplitude waveform function; and an estimating module for estimating a phase difference between the MPP signal and the SPP signal according to the amplitude waveform function.

8. The system of claim 7, wherein the phase difference is caused by mechanism errors of the optical recording/reproducing apparatus, the system further comprising:

a waveform comparing module for selecting the MPP waveform from a predetermined position, confirming a slope of the MPP waveform, and further comparing the SPP waveform and the MPP waveform to generate a relative position between the SPP waveform and the MPP waveform; and a correction signal generating module for determining an adjusting direction of a mechanism according to the relative position, wherein the adjusting direction and the phase difference are used to correct the deviation.

9. The system of claim 7, wherein the DPP signal is a tracking error signal being applied to a DVD device.

10. The system of claim 9, wherein the DVD device is selected one from a group consisting of a DVD+R/RW and a DVD−R/RW.

11. The system of claim 7, wherein the MPP waveform and SPP waveform are defined as sine waves, the method estimating the phase difference .PHI. between the MPP signal and the SPP signal by an equation $\Phi=2\times\cos^{-1}(\text{Amplitude}(A(t))/2)$, wherein the Amplitude(A(t)) is a magnitude of the amplitude waveform function A(t).

\* \* \* \* \*